United States Patent [19]
Gitlitz et al.

[11] Patent Number: 5,770,672
[45] Date of Patent: Jun. 23, 1998

[54] CATALYST FOR LOW TEMPERATURE CURE OF BLOCKED ISOCYANATES

[75] Inventors: Melvin H. Gitlitz, Berwyn; Sri R. Seshadri, Newtown, both of Pa.

[73] Assignee: Elf Atochem North America, Inc., Philadelphia, Pa.

Related U.S. Application Data

[60] Provisional application No. 60/018,438 May 28, 1996.

[21] Appl. No.: 826,603
[22] Filed: Apr. 3, 1997
[51] Int. Cl.$^6$ ..................................................... C08G 18/24
[52] U.S. Cl. .................................. 528/58; 528/45; 556/83; 427/385.5
[58] Field of Search .......................... 528/45, 58; 556/83; 427/385.5

[56] References Cited

U.S. PATENT DOCUMENTS 4,554,110  11/1985  Mark ......................................... 556/83
5,149,856  9/1992  Schön et al. ............................. 558/270

*Primary Examiner*—Rachel Gorr
*Attorney, Agent, or Firm*—Stanley A. Marcus; Nicholas J. DeBenedictis

[57] ABSTRACT

The present invention comprises a polystannoxane catalyst, a curable composition containing the catalyst and a method of using the catalyst and curing the composition. The curable composition comprises:

(i) a blocked isocyanate;
(ii) a functional component containing reactive hydrogen;
(iii) a polystannoxane catalyst for promoting the reaction of the blocked isocyanate with the functional component.

A co-catalyst may also be employed based on Cu, Zn, Ni, Zr, Ce, Fe, Co, V, Sb and Bi and especially oxides, salts or chelates of said metals. The invention also relates to a method for curing a blocked isocyanate at a low reaction temperature which comprises combining the catalyst with the blocked isocyanate and functional component and heating to a temperature less than about 180° C. to obtain a cured urethane.

34 Claims, No Drawings

CATALYST FOR LOW TEMPERATURE CURE OF BLOCKED ISOCYANATES

CROSS REFERENCE TO COPENDING APPLICATION

This application is a Continuation-in-Part Application of U.S. Provisional patent application Ser. No. 60/018,438 entitled "Catalyst for Low Temperature Cure of Blocked Isocyanates" filed on May 28, 1996.

BACKGROUND OF THE INVENTION

1. Field of the Invention

The invention is directed to polystannoxane catalysts useful for low temperature curing of blocked isocyanates.

2. Description of Related Art

In one part coating formulations, blocked isocyanates are preferred over unblocked isocyanates to obtain good stability for long shelf life. Blocked isocyanates are unblocked by heating the formulation to initiate the curing reaction usually with a polyol. Catalysts are used to promote the unblocking and curing reactions to enable them to proceed at lower temperatures and/or faster curing times. It is difficult to find a catalyst that has little or no activity at ambient temperatures for prolonged stability (shelf life) and also initiates rapid curing upon heating the formulation to moderate temperatures. Achieving slight reductions in cure temperatures of only several degrees while retaining ambient temperature stability represents a significant improvement and a major inventive step as cure temperatures get closer to ambient temperatures. Lower curing temperatures conserve energy, reduce deformation of plastic substrates, and reduce color formation.

Organotin compounds, particularly diorganotins such as dibutyltin dilaurate and dibutyltin oxide, are commonly used for the curing reaction of blocked isocyanates with hydroxyl-containing compounds. Certain stannoxanes have also been used as catalysts for unblocking polyisocyanates.

Yutaka, M. et al, U.S. Pat. No. 3,676,402 (1972) teaches octaalkyl-stannoxanes as catalysts for regeneration of an isocyanate group in a blocked isocyanate compound at low cure temperatures. The nomenclature used in the present patent application names octaalkyl-stannoxanes of the Yutaka patent as polystannoxane compounds of a general formula disclosed hereinafter in which N equals zero rather than a "dimer" of the formula disclosed in the Yutaka patent. This difference is only one of nomenclature. Likewise, the common, commercially available catalyst, dialkyltin oxide such as dibutyltin oxide described as prior art in the Yutaka Patent, is characterized herein as a polystannoxane of the general formula in which N equals infinity. The use of a single general formula herein for polystannoxanes brings greater clarity to the description of that family of catalysts having values of N from 0 to infinity.

The history of the preparation of polystannoxanes is described in an article entitled "Polymeric stannoxanes" by Davis, Alwyn, et al that appeared in the Journal of *Organometallic Chemistry*, Vol 10 (1967) at pages 33 and 34. The authors describe the preparation of distannoxanes (compounds of the general formula used herein with N equal to 0) and the preparation of the infinite polymer (N equal to infinity) as having been accomplished by the hydrolyses of dialkyltin dichlorides, but that no recognized compounds of intermediate molecular weight could be prepared by such a route. The authors discovered that polystannoxanes of controlled size, i.e. with values for N between 0 and infinity could be prepared by telomerisation reactions between alkyltin chlorides and dialkyltin oxides. However the use of such polystannoxanes as catalysts is not mentioned. The authors elaborated on this research in a subsequent article entitled "Organotin Chemistry. Part VII. Functionally Substituted Distannoxanes and Oligostannoxanes" J. Chem. Soc. 1970, 2030.

The Yutaka patent disclosed that the octaalkyl-stannoxane catalysts (N=0) constitute an improvement over the closest prior art catalyst, dialkyltin oxide (N equal to infinity) because lower temperatures for catalyzed unblocking of blocked isocyanates is achieved at N equal to zero. Therefore, Yutaka discloses that cure temperature is optimized by reducing the value of N to zero from infinity.

In contrast, the present invention is based upon the surprising discovery that there is an anomaly in the correlation between values for N and temperatures for unblocking isocyanates. Minimum cure temperature is not achieved by reducing N to zero as taught by Yutaka. Applicants discovered that between N equals 0 and N equals infinity, there exists a small range of values for N for which even lower temperatures are achievable for catalyzing the unblocking of isocyanate groups, lower than achieved at N equal to infinity and even lower than that achieved by the catalysts of Yutaka (N equal to zero).

Yokoo. M. et al, U.S. Pat. No. 3,681,271 discloses octaalkyl-stannoxane (N=0) as a catalyst for polyurethane foam.

Keshi. A. et al, U.S. Pat. No. 3,703,484 is similar to the teaching of the previously cited Yutaka patent (3,676,402) with respect to octaalkyl-stannoxane (N=0).

"Novel Template Effects of Distannoxane Catalysts in Highly Efficient Transesterification and Esterification", by Junzo Otera, et al, in Journal of *Organic Chemistry*, 1991, Vol 56, No 18. uses slightly different nomenclature, disubstituted tetraorgano-distannoxanes, to describe essentially the same molecule that Yutaka described as octaalkyl-stannoxanes and described herein by a general formula for stannoxanes with n=0.

A series of U.S. Pat. Nos. issued to Nichols. James D. and Dickenson. John B. including 5,149,814; 5,145,976; 5,089,645; 5,089,584; 5,089,583; and 4,987,244 disclose organotin catalysts for polyurethane and contains a good summary of the relevant art.

Thiele et al., Plaste und Kautschuk, 36 January 1989 (1) pp. 1–3, disclose the reaction of phenylisocyanate and butanol in the presence of bis, tributyltin oxide as a model reaction for urethane polymers.

Jerabek, U.S. Pat. No. 4,031,050, Jerabek et al. U.S. Pat. No. 4,017,438 and Bosso et al. U.S. Pat. No. 4,101,486 describe aqueous coating compositions based on blocked organic polyisocyanates, an amine adduct of an epoxy group-containing resin and a diorganotin catalyst.

Chung et al. U.S. Pat. No. 5,116,914 notes that dibutyltin oxide, (N equals infinity, R equals butyl) which is used as a catalyst in aqueous coatings, is difficult to disperse whereas dibutyltin dilaurate can be hydrolyzed which causes cratering problems in the deposited film. The patentees describe the use of a dibutyltin diacetylacetonate catalyst to avoid these problems.

Treadwell et al. U.S. Pat. No. 4,032,468 describes the use of a methyl or methoxymethyltin oxide catalyst for the preparation of hydrolytically stable urethane foam precursors. The foam is formed by the reaction of the isocyanate component of the urethane foam with water.

Weisfeld. L. et al, Canadian Patent No. 794373, discloses diorganotin oxides of various molecular configurations as compositions of matter and their use as stabilizers for resins. The use of polystannoxanediol esters and other organotin complex compounds as stabilizers is also disclosed in U.S. Pat. Nos 2,628,211, and 2,604,460 both by inventor Gerry P. Mack. Organotin oxide-ester reaction products with up to five organotin oxide units per ester in the stannoxane polymer chain are disclosed in U.S. Pat. No. 2,783,632, inventor, E. W. Johnson along with their use as stabilizers for resins.

With respect to catalyzing polysiloxanes, although tin based catalysts have been utilized polystannoxanes have not been taught for such use. For example, Belgian Patent 722,441, (1969) discloses tetra organo distannoxanes as catalysts in organopolysiloxane compositions. Also see British 788,653 which discloses hexa-organo distannoxanes as catalysts for silicone rubber. British Patent 845,651 and British Patent 930,470 also concern similar catalyst chemistry.

SUMMARY OF THE INVENTION

The present invention is directed to the use of a polystannoxane of the following formula as a catalyst for unblocking and curing of isocyanates, esterification and transesterification reactions and curing of siloxanes:

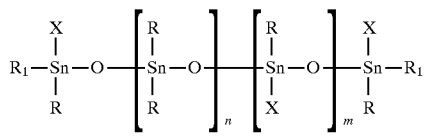

wherein each R is the same or different, and independently selected from alkyl groups having 1 to 20 carbon atoms such as a methyl, ethyl, propyl, butyl, isopropyl, amyl, hexyl, heptyl, lauryl, octyl, etc., (preferably butyl or octyl), or aromatic groups such as phenyl, tolyl, xylyl, or benzyl; each X is the same or different and independently selected from halogen atoms (e.g., chlorine, bromine, iodine, etc.), hydroxyl groups, alkoxy groups (e.g., methoxy, ethoxy, propoxy, butoxy, etc.), carbonate, phosphate, phosphinate, isocyanate, sulfonate, carboxylic, acyloxy groups (e.g., formyloxy, acetoxy, propionoyloxy, butyroyloxy, hexanolyloxy, lauroyloxy, oleoyloxy, palmitoyloxy, stearoyloxy, benzolyloxy, allylcarbonyloxy, cyanoacetoxy, benzyloyloxy alkyl, maleoyloxy, etc.,), a mono organotin group of the formula:

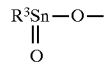

in which $R^3$ is selected from among the same group as R in the main formula, a tri organotin group of the formula $(R^2)_3SnO$— in which each R2 is independently selected from among the same group as R in the main formula; each $R_1$ is the same or different and selected from among the same groups as R or X; n is an integer from 1 to 20, m is an integer from zero to 19, and the sum of n plus m is an integer from 3 to 20 (the sum of n plus m is also referred to herein as N).

Such polystannoxanes are also excellent catalysts for esterification and transesterification reactions as well as for catalyzing silicone polymerization reactions.

A curable composition is also provided comprising:
(i) a blocked isocyanate;
(ii) a functional component reactive with the blocked isocyanate, the functional component containing reactive hydrogen; and,
(iii) a polystannoxane of the formula defined above.

The invention also includes a method for rapidly curing a blocked isocyanate at low reaction temperatures for unblocking isocyanates. The method comprises heating a mixture of the polystannoxane catalyst of the above formula, a blocked isocyanate and the functional component to a reaction temperature sufficient to initiate unblocking of the isocyanate and to produce a cured polyurethane.

DETAILED DESCRIPTION

This invention concerns polystannoxanes as catalysts for reacting or curing of blocked isocyanates, especially aliphatic alcohol-blocked polyisocyanates, with a functional compound capable of reacting with an isocyanate and for catalyzing esterification and transesterification reactions and silicone polymerization reactions.

With respect to catalysts for reacting or curing of blocked polyisocyanates the present invention is based on the discovery that polystannoxane catalysts of the above formula function at lower temperatures, (lower than about 180° C.) than polystannoxanes of the same formula but having average values for the sum of n plus m of less than three or larger than 20, i.e. approaching infinity as dibutyltin oxide. The superior catalytic activity is particularly unexpected in view of the decrease in solubility of such polystannoxanes as the value of N increases and the teaching in the closest prior art, Yutaka patent, that the lowest cure temperatures are achieved with N equal to zero verses N equal to infinity.

Polystannoxane catalysts of the present invention are of the formula:

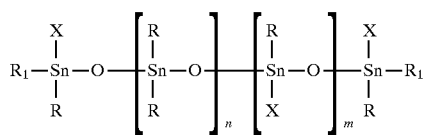

wherein each R is the same or different, and independently selected from alkyl groups having 1 to 20 carbon atoms such as a methyl, ethyl, propyl, butyl, isopropyl, amyl, hexyl, heptyl, lauryl, octyl, etc., (preferably butyl or octyl), or aromatic groups such as phenyl, tolyl, xylyl, or benzyl; each X is the same or different and independently selected from halogen atoms (e.g., chlorine, bromine, iodine, fluorine, etc.), hydroxyl groups, alkoxy groups (e.g., methoxy, ethoxy, propoxy, butoxy, etc.), carbonate, phosphate, phosphinate, isocyanate, sulfonate, carboxylic, acyloxy groups (e.g., formyloxy, acetoxy, propionoyloxy, butyroyloxy, hexanolyloxy, lauroyloxy, oleoyloxy, palmitoyloxy, stearoyloxy, benzolyloxy, allylcarbonyloxy, cyanoacetoxy, benzyloyloxy alkyl, maleoyloxy, etc.,), a mono organotin group of the formula:

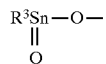

in which $R^3$ is selected from among the same group as R in the main formula, a tri organotin group of the formula $(R^2)_3SnO$— in which each $R^2$ is selected from among the same group as R in the main formula; each $R_1$ is the same or different and selected from among the same groups as R or X; n is an integer from 1 to 20, m is an integer from zero to 19, and the sum of n plus m is an integer from 3 to 20. However, for catalyzing esterification and transesterification reactions and silicone polymerization reactions, n is zero or an integer from 1 to infinity, m is zero or an integer from zero to infinity, and the sum of n plus m is zero or an integer from 1 to infinity. In the main formula O stands for oxygen but sulfur would be equivalent.

Mixtures, and especially two, three or four component mixtures of the foregoing tin catalyst may also be used.

Preferred catalysts of the invention are compounds with R being butyl, octyl, phenyl or benzyl or combinations thereof, X being OH, OOCR such as formate or acetate or OR with R being butyl, octyl, phenyl or benzyl, and N having a value of 3 to 16. The best catalytic activity seems to be with N equal to 14 but such catalysts are difficult to dissolve. While integers are stated for n, m and N, actual synthesis of such compounds results in a mixture or so that n, m and N are actually average values for the mixture. Accordingly, the values for n, m and N are not limited to whole integers within the stated ranges for n, m and N. Likewise a mixture of stannoxanes for which N has an average value of 3 is within the stated range for N of from 3 to 20 even though some stannoxanes in the mixture have values for N of less than 3, e.g. 2 while others have values of N greater than 3, e.g. 4.

Compounds of the above formula can be produced by refluxing in toluene for 15 to 30 minutes a mixture of a dialkyltin oxide and a dialkyltin(X)2 in a molar ratio selected to yield the desired values for N. n and m. For example, starting with a mixture of 1.8 moles of dibutyltin oxide and 0.3 moles of dibutyltin dicarboxylate results in dibutylformyloxystannoxane with both N and n equal to 6 and m equal to 0 when the carboxylate is formate. The dibutylformyloxystannoxane so produced is a compound of the general formula with each R being butyl and each X being formate. A synthesis route for polystannoxanes is also described in "Polymeric stannoxanes" by Davis, Alwyn, et al that appeared in the Journal of Organometallic Chemistry, Vol 10 (1967) and in "Organotin Chemistry. Part VII. *Functionally Substituted Distannoxanes and Oligostannoxanes*" J. Chem. Soc. 1970, 2030.)

In another aspect of the present invention, it has been found that improved performance of the polystannoxane catalysts such as reduced cure temperatures can be obtained by employing one or more conventional co-catalysts with the catalyst of the present invention. These co-catalysts are preferable based on the elements from Groups VIIB, VIII, IB, IIB, IVA or VA of the Periodic Table of the Elements such as manganese, cobalt, nickel, copper, zinc, zirconium germanium, antimony, or bismuth, especially compounds based on an element from the foregoing Groups metals, such as bivalent metals, and particularly chelates of metals, or oxides or salts of these metals and especially carbonate salts are preferred. Zinc, bismuth, and antimony are especially preferred metallic elements, with zinc acetal acetate being most preferred. Combinations of the catalysts are also included within the scope of the invention, especially two, three or four component combinations.

Representative salts of these cocatalyst metals are based on inorganic acids, carboxylic acids, hydroxy carboxylic acids, alcohols, glycols and phenols.

Representative carboxylic acids include both mono and dicarboxylic acids containing from 1 to about 20 carbon atoms and include aliphatic and cycloaliphatic saturated or unsaturated acids, and aromatic acids, and include formic, acetic, acrylic, methacrylic, propionic, butyric, hexanoic, octanoic, decanoic, stearic, oleic, eiconsanoic and benzoic acids. Examples of dicarboxylic acids include oxalic, malic, maleic, succinic, sebacic and the various isomeric phthalic acids. Typical hydroxy carboxylic acids preferably contain from 2 to about 20 carbon atoms and include hydroxy acetic, lactic, citric, tartaric, salicylic, and gluconic acids.

Inorganic acids or the mineral acids include carbonic acid, halogen acids such as hydrochloric, hydrobromic, and hydriodic acids, nitrogen acids, sulfur acids and phosphorus acids, all of which are known in the art.

The alcohols comprise straight chain or branched chain mono- or polyhydroxy alcohols, alkyl substituted or unsubstituted mononuclear or polynuclear mono or polyhydroxy cycloaliphatic alcohols and the like containing from 1 to about 20 carbon atoms. The phenols comprise alkyl substituted or unsubstituted mononuclear or polynuclear mono or polyhydroxy phenols.

The carbonates of the aforesaid metals may exist as pure carbonates or as basic carbonates which are believed to be mixtures of the carbonate and the oxide or hydroxide of the metal in a single molecule and include metal carbonates such as basic zinc carbonate, basic copper carbonate and the like.

The chelates of the aforesaid metals that may be employed may be based on any metal chelating compounds known in the art but typically comprise beta-diketones such as acetyl acetone to provide the acetylacetonates of the metals.

Metal catalysts that are generally most suitable as cocatalysts are the ones that are soluble in the formulation especially if soluble in the functional compound ,e.g. the polyol resin or soluble in the solvent if the formulation uses a solvent.

Some specific metal catalysts that may be employed comprise zinc carbonate (basic), zinc acetylacetonate, zinc acetate, copper acetylacetonate, iron acetylacetonate, nickel acetylacetonate, zinc acetate, zinc lactate, and copper acetate. Such suitable metal cocatalysts are generally described by Leiner and Bossert in U.S. Pat. No. 4,395,528.

The catalyst of the present invention can also be employed in combination with other known urethane catalysts or catalysts for esterification, transesterification, or silicone polymerization depending on the desired reaction to be catalyzed. The ratio by weight of the polystannoxane catalyst component to metal or non-metal co-catalyst(s) component is in the range of about 10:1 to 1:10 and preferably 4:1 to 1:4. Whether the catalyst package comprises tin-containing catalysts alone or in combination with co-catalysts, the percent by weight of tin as based upon the weight of the resin components. i.e. the blocked isocyanate, and the functional component containing the active hydrogen capable of reaction with the blocked isocyanate, should be in the range of about 0.02% to 2%, preferably 0.05% to 1% and ideally in the range of about 0.1% to 0.5%. These percents and all other proportions used herein are by weight unless otherwise stated.

In the present invention, the term "a blocked isocyanate" is used in its ordinary meaning to those skilled in the art, who understand it to mean a compound containing blocked isocyanate groups in its structure obtained by the addition reaction of an isocyanate with an isocyanate blocking agent.

Isocyanate compounds that can be blocked for stability and subsequently unblocked are well known and include both aliphatic isocyanates and aromatic isocyanates Examples of aliphatic polyisocyanates are tetramethylene diisocyanate, hexamethylene diisocyanate. Examples of aromatic isocyanates are phenylene diisocyanate, tolylene diisocyanate (TDI), diphenylmethane diisocyanate (MDI), diphenylethane diisocyanate (EDI), naphthylene diisocyanate, diphenylmethane triisocyanate, bitolylene diisocyanate, dianisidine diisocyanate, triphenylmethane triisocyanate, diphenylether triisocyanate, omega, diisocyanate dimethylbenzene (MXDI) and dimers and trimers of the above isocyanates.

Also suitable are addition products having two or more terminal NCO groups obtained by the reaction of an excess amount of the above-mentioned isocyanates with lower molecular active hydrogen compounds such as ethylene glycol, propylene glycol, butylene glycol, trimethylol propane, hexanetriol, glycerol, sorbitol, pentaerythritol, castor oil, ethylenediamine, hexamethylenediamine, monoethanolamine, diethanolamine, triethanolamine, or with such polymeric compounds having active hydrogen atoms as polyether based or polyester based polyols. Also suitable are organic polyisocyanates prepolymers such as a prepolymer derived by reacting a polyol with an polyisocyanate in a proportion having a light excess of isocyanate groups so that the prepolymer contains isocyanate terminal groups.

Of the polyisocyanate compounds, aromatic polyisocyanates such as TDI, MDI, MXDI, or EDI, and the addition products having two or more terminal NCO groups obtained by the addition of the excess amount of said aromatic polyisocyanate with the aforementioned low or high molecular weight compounds containing active hydrogen atoms, are preferable.

Examples of the isocyanate blocking agents are those commonly employed in the art, such as various phenolic compounds, for example, phenol, thiophenol, chlorophenol, methyl thiophenol, ethyl phenol, ethyl thiophenol, nitrophenol, cresol, xylenol or resorcinol; alcohols such as ethanol, methanol, propanol, isopropanol, butanol, tert-butanol, tert-pentanol, tert-butanethiol or tert-hexanol, or derivatives thereof such as ethylene chlorohydrine, omega-hydroperfluoroalcohols or 1,3-dichloro-2-propanol; aromatic amines such as diphenylamine, diphenyl naphthyl amine or xylidine; imides such as succinic acid imide or phthalic acid imide; active methylene compounds such as acetoacetic acid esters, acetyl acetone or malonic acid diesters; mercaptans such as 2-mercapto benzo-thiazol or tert-dodecyl mercaptan; pyrazoles such as 3,5-dimethylpyrazole, lactams such as epsilon -caprolactam, delta -valerolactam, gamma-butyrolactam or beta -propyllactam, imines such as ethylene imine, urea compounds such as urea, thiourea or diethylene urea, oximes such as acetoxime, methylethyl-ketone oxime, or cyclohexanone oxime, diaryl compounds such as carbazole, phenyl naphthyl amine or N-phenyl xylidine, bisulfates and borates. Of these blocking agents, phenolic compounds and ethanol are preferable.

The blocked isocyanate may be readily prepared in a known manner, for example, by reacting a polyisocyanate compound with an equivalent or a slightly excess amount of an isocyanate blocking agent in the presence or absence of a solvent having no active hydrogen atom, such as ketones, esters or aromatic hydrocarbons at room temperature or about 40° C. to about 120° C.

Preferred functional compounds for reaction with the blocked isocyanate are ester containing and ether containing polyols. Such compounds are well known it the art of making polyurethanes. Examples are polyols obtained by the addition polymerization of one or more alkylene oxides such as ethylene oxide, propylene oxide, butylene oxide, or styrene oxide, to one or more polyols, as the initiator, such as ethylene glycol, diethylene glycol, propylene glycol, glycerol, trimethylol propane, hexanetriol, pentaerythritol, sorbitol, sucrose, mannitol, sorbide, mannitan, or sorbitan, or to amines such as ethylene diamine, propylene diamine, and ethanolamine under alkaline or acidic conditions.

Polyether polyol resins are particularly suitable for use as said functional component such as those prepared as described in the publication entitled "High Polymer Vol. XIII, Polyethers Part 1" (1963) by Norman G. Gaylord published by Interscience Publishers, New York, N.Y. The molecular weight of the polyether polyols may be varied depending upon the purpose, and is generally selected from the range of about 300 to about 3,000, preferably about 400 to about 2,000.

Ester containing polyol resins are also preferred as the functional component such as those obtained by the reaction of a polyol with a polycarboxylic acid. For example polyols such as ethylene glycol, propylene glycol, diethylene glycol, triethylene glycol, butylene glycol, trimethylol propane, glycerol, hexanetriol or pentaerythritol can be reacted with one or more polycarboxylic acids such as oxalic acid, succinic acid, glutaric acid, adipic acid, pimelic acid, suberic acid, azelaic acid, sebacic acid, maleic acid, fumaric acid, itaconic acid, phthalic acid, iso-phthalic acid, terephthalic acid, or their acid anhydrides. Acrylic polyester polyols are another commercially useful class of suitable polyols. Polyester polyols are prepared in a known manner as described in the publication entitled "Polyesters and Their Application," Apr. 1959, published by Bjorksten Research Lab., Inc., New York, N.Y. The molecular weight of the polyester polyols may vary depending upon the purpose desired, and is generally selected from the range of about 300 to about 3,000, preferably about 400 to about 2,000.

The functional compound or functional component may also comprise a resin which is an adduct of a primary and/or secondary amine with an epoxy group-containing resin or a resin which is an adduct of an amine-acid salt with a polyepoxide.

Functional compounds or components containing reactive hydrogen suitable for practicing the present invention are well known and described in patents such as U.S. Pat. Nos. 3,084,177; 3,240,730; 3,392,128 and 3,392,153, inventors, Hostettler et al.

The invention also relates to a method for rapidly curing a blocked isocyanate at low reaction temperatures for unblocking a isocyanate. The method comprises heating a mixture of the polystannoxane catalyst, a blocked isocyanate and the functional component to a reaction temperature sufficient to initiate unblocking of the isocyanate and to produce a cured polyurethane. When the isocyanate is blocked with a 2-ethylhexyl group, the mixture is heated to a reaction temperature as low as about 150° C. for unblocking and curing. When the isocyanate is an oxime blocked isocyanate, e.g. methylethylketoxine, said reaction temperature can be as low as about 110° C. to 115° C. provided a soluble metalic cocatalysts such as zinc acetyl acetonate is used in combination with the polystannoxane of the present invention verses 140° C. to 150°0 C. with dibutyltin dilurate catalyst. When the isocyanate is blocked with an lactam group, said reaction temperature can be as low as about 135°0 C. to 140° C. when a soluble metalic cocatalysts is also used such as zinc acetyl acetate verses 160°0 C. to 175°0 C. with dibutyltin dilurate catalyst. When the isocyanate is blocked with 2-ethylhexanol, said reaction temperature is low especially when a soluble metalic cocatalysts is also used such as zinc acetyl acetate verses 180°0 C. to 200° C. with dibutyltin dilurate catalyst. When the isocyanate is blocked with 3,5-dimethylpyrazole, said reaction temperature is low especially when a soluble metalic cocatalysts is also used such as zinc acetyl acetate verses 140° C. to 150° C. with dibutyltin dilurate catalyst. When the isocyanate is blocked with diethyl malonate, said reaction temperature is low especially when a soluble metalic cocatalysts is also used such as zinc acetyl acetate verses 120° C. to 135° C. with dibutyltin dilurate catalyst.

The following commercially available ingredients are preferred for practicing the present invention for polyurethane reactions: (a) Acrylic polyols—Desmophen A565 (Miles, Inc.), Joncryl 500 (SC Johnson), (b) Polyester polyols-Desmophen 680-70 (Miles, Inc.), K-Flex 188 (King Industries), Rucote 104 (Ruco), © polyether polyol-Desmophen 1600 U (Miles, Inc.), (d) polybutadiene polyol-Poly bd R45HT (Elf Atochem), (e) blocked hexamethylene diisocyanate, Desmodur Bl 3175A (Bayer), (f) caprolactam blocked isopherone diisocyanate, Vestagon B 1530 (Huls).

Also provided is an improved process for catalyzing the making of a polyurethane from reactants containing a blocked isocyanate and a catalyst wherein the improvement comprises utilizing as the catalyst for both unblocking the isocyanate and polyurethane formation, a polystannoxane of the formula:

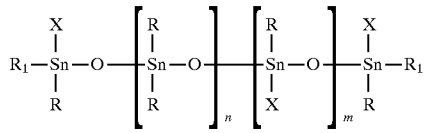

wherein each R is the same or different, and independently selected from an alkyl group having 1 to 20 carbon atoms, and an aromatic group; each X is the same or different and independently selected from halogen, hydroxyl, alkoxy, carbonate, phosphate, phosphinate, isocyanate, sulfonate, carboxylic, acyloxy, a mono organotin group of the formula:

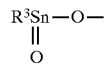

in which $R^3$ is selected from among the same group as R, or a tri organotin group of the formula $(R^2)_3SnO$— in which each $R^2$ is selected from among the same group as R; each $R_1$ is the same or different and selected from among the same groups as R or X; n is an integer from 1 to 20, m is an integer from zero to 19, and the sum of n plus m is an integer from 3 to 20.

With respect to esterification and transesterification reactions, the improved process uses conventional compounds capable of esterification or transesterification reactions and a catalyst for said reactions, the improvement comprises utilizing as the catalyst, a polystannoxane of the formula:

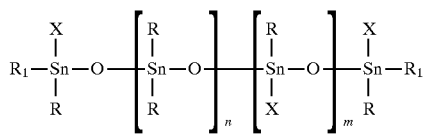

wherein each R is the same or different, and independently selected from an alkyl group having 1 to 20 carbon atoms, and an aromatic group; each X is the same or different and independently selected from halogen, hydroxyl, alkoxy, carbonate, phosphate, phosphinate, isocyanate, sulfonate, carboxylic, acyloxy, a mono organotin group of the formula:

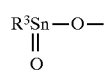

in which $R^3$ is selected from among the same group as R, or a tri organotin group of the formula $(R^2)_3SnO$— in which each $R^2$ is selected from among the same group as R; each $R_1$ is the same or different and selected from among the same groups as R or X; n is an integer from 1 to 20, m is an integer from zero to 19, and the sum of n plus m is an integer from 3 to 20.

Likewise, with respect to catalyzed polysiloxane reactions from conventional polysiloxane forming reactants, the improvement comprises utilizing as the catalyst, a polystannoxane of the formula:

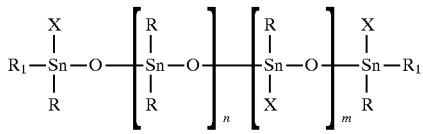

wherein each R is the same or different, and independently selected from an alkyl group having 1 to 20 carbon atoms, and an aromatic group; each X is the same or different and independently selected from halogen, hydroxyl, alkoxy, carbonate, phosphate, phosphinate, isocyanate, sulfonate, carboxylic, acyloxy, a mono organotin group of the formula:

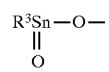

in which $R^3$ is selected from among the same group as R, or a tri organotin group of the formula $(R^2)_3SnO$— in which each $R^2$ is selected from among the same group as R; each $R_1$ is the same or different and selected from among the same groups as R or X; n is an integer from 1 to 20, m is an integer from zero to 19, and the sum of n plus m is an integer from 3 to 20.

The following examples are illustrative of the invention.

The commercially available chemicals used in the examples are more specifically described as follows: Desmophen A565 is a hydroxyl-bearing polyacrylate available as a 65% solution in xylene. It has an OH content of approximately 2.7%, an OH equivalent weight of 600, an acid value of less than 10, a density of 1.03 g/cm$^3$ at 20° C. and a viscosity of about 1000 mPa at 23° C. and is available in the U.S. from Miles, Inc. (Bayer). Desmodur BL3175A is also available from Miles, Inc. and is blocked hexamethylene diisocyanate having a blocked NCO content of 11.3%, an average equivalent weight of 372 and a viscosity between 2000 and 4000 mpa.s at 23° C.

In all the examples the following procedures were used with a formulation consisting of a functional resin, an polyisocyanate crosslinker, solvent(s) and catalyst. Formulations were well stirred to ensure complete homogeneity prior to evaluation. With some solid catalysts it was necessary to heat the formulation to 50° C. for 1–4 hours for complete solubility of the catalyst. In other instances a suitable blend of solvents was used to predissolve the catalyst prior to incorporation. The ratio of NCO/OH in the formulation was between 1.1 to 1.2. Solids content was maintained between 50–60%.

Comparison of catalyst activity was determined by monitoring viscosity as a function of cure time. A Brookfield viscometer fitted with a heated cell was connected to a strip chart recorder. A 10 gram aliquot of the formulation with the desired catalyst was placed in the chamber and rapidly heated to the test temperature. A #27 speed spindle was immersed into the solution and the initial viscosity measured. The rate of increase in viscosity was monitored until a viscosity of 2500 cps was achieved. In almost all the examples the formulation gelled at this viscosity. The time required to reach this viscosity was termed "gel time" at the test temperature. This technique provides information on the time required to reach a target viscosity and on the rate of increase in viscosity for a given system and compares the relative reactivity of different catalysts in a specific formulation at the same temperature. Variability in gel time is +/− 0.5–1.0 mins and is limited by the accuracy of weighing of the catalyst. Lower gel time shows better, i.e. faster catalytic activity. Gel time measurements were then correlated with film properties.

Film properties were evaluated by comparing the cured coating quality with a solvent rub test and an acid etch test. Formulations containing the catalyst were coated on 316 stainless steel panels and cured at various temperatures. The cured panel was subjected to solvent resistance and acid-etch tests. Solvent resistance was determined with methyl isobutyl ketone (MIBK) double rubs and recording the number of double rubs to wear through the film. The panel is examined at regular intervals during the rub test to determine if the surface has been marred. The number of double rubs necessary to mar the surface is recorded. If there is no effect on the surface after 100 rubs then the value recorded is >100 double rubs. Acid-etch was measured by placing several drops of 50% sulfuric acid solution on a coated panel, covering the panel with glass jar and evaluating the panel for swelling, blistering or softening at regular intervals over a 24 hour period. Films were also prepared on transparent glass slides to monitor color development. Control experiments were carried out using dibutyltin oxide (N=infinity) and tetrabutyl diacetoxystanoxane (N=0) as reference catalysts. Catalyst were compared on equal Sn basis.

EXAMPLES 1 to 8 and A to J

In comparative examples A to J and operative examples 1 to 8 a masterbatch of the following mixture was prepared. The components were stirred to ensure complete solubility, usually from 2 to 4 hours.

Desmophen A565 (215g, 42.9 wt%)

Desmodur BL 3175 A (140g, 27.9 wt%)

methyl amyl ketone (58.5g, 11.7 wt%)

methy isobutyl ketone (58.5g, 11.7 wt%)

propylene glycol methyl ether acetate (29.0g, 5.8 wt%)

For each evaluation, a 10 g aliquot of this master batch was removed and the appropriate catalyst added.

The results of Examples 1–8 and A to J are shown in Table 1.

EXAMPLES 9 to 12 and K

In comparative example K and operative examples 9 to 12 a masterbatch of the following mixture was prepared. The components were stirred to ensure complete solubility, usually from 2 to 4 hours.

Desmophen A565 215g

Desmodur BL 3175 A 140g

Methyl isobutyl ketone 146.4g

For each evaluation, a 10 g aliquot of this master batch was removed and the appropriate catalyst added.

The formulations chosen for the examples were designed for catalyst performance comparison. The results are summarized in Tables II to IV.

In the examples organotin catalysts of the present invention were synthesized, evaluated and compared with dibutyltin oxide(N=infinity) and tetrabutyldiacetoxystannoxane (N=0) to represent the closest organotin prior art catalysts and with the commercial catalysts dibutyl tin diacetate and dibutyl tin dilurate. Catalysts of the present invention demonstrated improved performance characteristics in oxime blocked HDI—acrylic polyol systems compared to dibutyltin dilaurate and tetrabutyl diacetoxystanoxane. Gel time measurements show at least 20% faster reactivity with the catalysts of the present invention. Films were prepared using a 4 mil draw down bar (2 mil dry film) and cured at 130° C. Again, this temperature was selected to demonstrate the performance differences between catalysts. Panels cured at 130° C. with a catalyst of the present invention at 0.16% Sn gives very good film properties. The cured formulation resists 75 MEK double rubs and is not attacked by 50% sulfuric acid or xylene solution while 100 MEK double rubs at 130° C. was achieved with the catalysts at 0.25% Sn in the formulation. Under the same conditions, dibutyltin dilaurate cured coating is immediately attacked by MEK and 50% sulfuric acid. Complete cure (>100 MEK rubs) with dibutyltin dilaurate would require cure temperature of 140° C.

This reduced cure temperature could not be accomplished by simply increasing the use level of dibutyltin dilaurate (requires 140° C. for complete cure). The ability to realize complete cure at ~10° C. lower temperature is significant because it allows one component urethane formulations to compete with other coating technologies particularly on temperature sensitive substrates.

The coating compositions used in the examples were formulated without any pigment or filler so as not to add an unnecessary variable into the comparison. However, the compositions of the present invention can be employed in mixtures and coating formulations having additional additives such as pigments and fillers, or additives intended to impart other functional activities to coatings such as biocides, fungicides or the like in accordance with well known practices in the coating art.

When selecting a polyisocyanate catalyst of the present invention for use in a specific formulation it is preferred to use a liquid catalyst or a catalysts that is soluble in the solvent system employed in the coating composition. Liquid organo tin catalysts are preferably employed because dispersion of the catalyst in the formulation is more readily obtained. Preferred solvents for use in the formulation are methylethylketone (MEK), methylamylketone (MAK), methylisobutylketone (MIBK) and mixtures of pentanedione and methanol or propylene glycol with methylethylacetate. In addition, the resin or other polyol can act as a solvent for the catalyst.

The coating compositions of the present invention can be applied to metallic or polymeric substrates including both thermoplastic and thermosetting polymers, especially polyolefins, phenolics, polyvinylchlorides, polyvinylidine chlorides and fluorides, polyesters, ABS polymers, acrylics, epoxies, polyamides, Teflon® and the like.

It will be apparent to those skilled in the art that various modifications and variations can be made to the curable composition containing a catalyst for the low temperature cure of blocked isocyanates as well as the method of the invention for obtaining such low temperature cures without departing from the spirit or scope of the invention. It is intended that these modifications and variations of this invention are to be included as part of the invention, provided they come within the scope of the appended claims or their equivalents.

The best mode presently known for practicing the present invention is with a polystannoxane of the formula that is soluble in a component of the curable composition or in a solvent that is also a solvent for one of the components in the composition. Particularly suitable are dibutyl diacetoxy stannoxane especially with n=6. Dibutyl diformylox stannoxanes are also very suitable, especially when used with a cocatalyst. Zinc acetylacetonate is the preferred cocatalyst. Preferred ratio of dibutyl diacetoxy stannoxane (n=6) to zinc acetylacetonate is 1.13:1 with stannoxane comprising 0.07% based on the combined weight of the isocyanate and polyol.

Variations in the selection of polystannoxane catalyst, cocatalyst and solvent should be made based upon the blocked polyisocyanate and the polyol being utilized.

TABLE I

Blocked HDI + Acrylic Polyol + MIBK + MAK

| Example # | CATALYST (0.16% Sn) | GEL TIME @ 130° C. | COMMENTS |
|---|---|---|---|
| A | Dibutyl Sn Dilaurate | 22.2 | soluble |
| B | Dibutyl Sn Diacetate | 21.2 | soluble |
| C | Dibutyl Sn Oxide | 23.2 | partly sol on heat; disp. |
| D | Dibutyl Diacetoxy Stannox n = 0 | 18.6 | soluble |
| 1 | Dibutyl Diacetoxy Stannox n = 3 | 17.2 | soluble on heating |
| 2 | Dibutyl Diacetoxy Stannox n = 6 | 16.4 | partly soluble after heat |
| 3 | Dibutyl Di Octylmaleate Stannox n = 6 | 20.4 | partly soluble after heat |

TABLE II

Blocked HDI + Acrylic polyol + MIBK + MAK

| Example # | CATALYST | % Sn, | solubility | Gel Time @ 250 F. (120 C.) | Gel Time @ 266 F. (130 C.) |
|---|---|---|---|---|---|
| E | None | | | | >140 min |
| F | Dibutyl Tin Dilaurate | 0.20 | soluble | 48.7 | |
| 4 | Dibutyl Diformyloxy Stannox (n = 3) | 0.20 | soluble | 27.5 | 15.9 |
| 5 | Dibutyl Diformyloxy Stannox (n = 6) | 0.20 | partly soluble on heating | 25.6 | |
| 6 | Dibutyl Diformyloxy Stannox (n = 14) | 0.20 | sparingly soluble on htg to 70 C. | 24.1 | 14.4 |
| G | None | | | | >140 rain |
| H | Dibutyl Tin Diacetate | 0.16 | soluble | 45 | 21.3 |
| I | Dibutyl Diacetoxy Stannox (n = 0) | 0.16 | soluble | 38 | 18.6 |
| 7 | Dibutyl Diacetoxy Stannox (n = 3) | 0.16 | partly soluble on heating | 36.1 | 17.2 |
| 8 | Dibutyl Diacetoxy Stannox (n = 6) | 0.16 | insoluble | 32.5 | 16.5 |
| J | Dibutyl Tin Oxide (n = ∞) | 0.16 | | | 23.2 |

TABLE III

Zn Salts as Co-CATALYSTS
Blocked HDI + Acrylic polyol

| Example # | CATALYST | % Sn, % Zn | Gel Time @ 125° C. | Gel Time @ 120° C. | Gel Time @ 115° C. |
|---|---|---|---|---|---|
| K | Dibutyl Tin Dilaurate | 0.16 | 29 min | 45 min | |
| 9 | Dibutyl Diformylox Stannox (n = 14) | 0.16 | 19 min | 29 min | |
| 10 | Dibutyl Diformylox Stannox (n = 14) Zn neo decanoate | 0.16 0.07 | 12 min | 17 min | 22 min |
| 11 | Dibutyl Diformylox Stannox (n = 14) Zn (acac)$_2$* | 0.16 0.07 | 12 min | 19 min | |
| 12 | Dibutyl Diformylox Stannox (n = 3) Zn (acac)$_2$* | 0.16 0.07 | 12 min | 17 min | 29 min |

*zinc acetylacetonate

TABLE IV

| | Cure at 122° C., 30 min | | | Cure at 130° C., 30 min | | |
|---|---|---|---|---|---|---|
| | | | | | 50% | |
| Example # | 100 MIBK double rubs | 50% H2SO4 resistance | xylene resistance | 100 MIBK double rubs | H2SO4 resistance | xylene resistance |
| K | <10 | etch in 1H | soft in 1H | <10 | etch in 3H | soft in 24H |
| 9 | 20 to 30 | swelling in 8H film intact | soft in 6H | 70 to 80 | no effect in 24H | no effect in 24H |
| 11 | >100 | no effect in 24H | no effect in 24H | >100 | no effect in 24H | no effect in 24H |
| 12 | >100 | no effect in 24H | no effect in 24H | >100 | no effect in 24H | no effect in 24H |

We claim:

1. A curable coating composition comprising:
   (i) a blocked isocyanate;
   (ii) a functional component containing at least one active hydrogen and reactive with said blocked polyisocyanate; and
   (iii) a polystannoxane catalyst for the reaction of said blocked polyisocyanate with said functional component, of the formula:

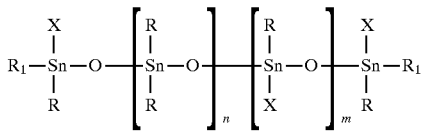

wherein each R is the same or different, and independently selected from an alkyl group having 1 to 20 carbon atoms, and an aromatic group; each X is the same or different and independently selected from halogen, hydroxyl, alkoxy, carbonate, phosphate, phosphinate, isocyanate, sulfonate, carboxylic, acyloxy, a mono organotin group of the formula:

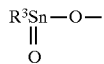

in which $R^3$ is selected from among the same group as R, or a tri organotin group of the formula $(R^2)_3SnO—$ in which each $R^2$ is selected from among the same group as R; each $R_1$ is the same or different and selected from among the same groups as R or X; n is an integer from 1 to 20, m is an integer from zero to 19, and the sum of n plus m is an integer from 3 to 20.

2. The curable composition of claim 1 wherein said R is independently selected from the group consisting of methyl, ethyl, propyl, butyl, isopropyl, amyl, hexyl, heptyl, lauryl, octyl, phenyl, tolyl, nylyl and benzyl, and the sum of n plus m is 3 to 16.

3. The curable composition of claim 2 wherein each X is independently selected from the group consisting of —OH, formate, acetate or —OR⁴ with R⁴ being butyl, octyl, phenyl or benzyl, and the sum of n plus m is 3 to 16.

4. The curable composition of claim 3, wherein said R is independently selected from the group consisting of propyl, butyl, isopropyl, hexyl, heptyl, lauryl, octyl, phenyl, and benzyl.

5. The curable composition of claim 4, wherein each R is butyl or octyl, and each X is formyloxy or acetoxy.

6. The composition of claim 1, wherein each X is independently selected from the group consisting of halogen, methoxy, ethoxy, propoxy, butoxy, carbonate, phosphate, phosphinate, isocyanate, sulfonate, formyloxy, acetoxy, propionoyloxy, butyroyloxy, hexanolyloxy, lauroyloxy, oleoyloxy, palmitoyloxy, stearoyloxy, benzolyloxy, allylcarbonyloxy, cyanoacetoxy, maleoyloxy, a mono organotin group of the formula:

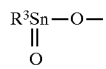

in which $R^3$ is selected from the group consisting of methyl, ethyl, propyl, butyl, isopropyl, amyl, hexyl, heptyl, lauryl, octyl, phenyl and benzyl, and a tri organotin group of the formula $(R^2)_3SnO—$ in which each R2 is selected from among the group consisting of methyl, ethyl, propyl, butyl, isopropyl, amyl, hexyl, heptyl, lauryl, octyl, phenyl and benzyl.

7. The composition of claim 6 wherein x is independently selected from the group consisting of chlorine, bromine, iodine, methoxy, ethoxy, propoxy, butoxy, carbonate, phosphate, isocyanate, sulfonate, acetoxy, formyloxy, propionoyloxy, and butyroyloxy.

8. The composition of claim 2, wherein said blocked isocyanate is a blocked polyisocyanate and said functional component reactive with said blocked polyisocyanate comprises a polyfunctional component containing at least one hydroxyl hydrogen.

9. The curable composition of claim 2, wherein said catalyst is a liquid at ambient temperature.

10. The composition of claim 2 wherein the polystannoxane catalyst constitutes from 0.02% to 2% of the total weight of the blocked isocyanate and the functional component.

11. The composition of claim 10 wherein the polystannoxane catalyst constitutes from 0.1% to 0.5% of the total weight of the blocked isocyanate and the functional component.

12. The curable composition of claim 1, further comprising a cocatalyst containing a metallic element selected from the group consisting of manganese, cobalt, nickel, copper, cerium, zirconium, iron, zinc, germanium, antimony, or bismuth.

13. The composition of claim 12 wherein the polystannoxane catalyst constitutes from 0.1% to 0.5% of the total weight of the blocked isocyanate and the functional component, each R is butyl, each X is formyloxy or acetoxy, the sum of n plus m is from 3 to 14, the cocatalyst is selected from the group consisting of zinc acetylacetonate, copper acetylacetonate, iron acetylacetonate, nickel acetylacetonate, zirconium acetylacetonate, bismuth acetylacetonate, zinc acetate and zinc lactate, and the ratio by weight of the polystannoxane catalyst to co-catalyst is in the range of 4:1 to 1:4.

14. The curable composition of claim 12, wherein said metallic containing cocatalyst is a chelate, oxide or salt of the metallic element.

15. The curable composition of claim 14, wherein said metallic containing cocatalyst is a salt.

16. The curable composition of claim 15, wherein said metallic salt is a salt of an inorganic acid, a carboxylic acid, or a hydroxy carboxylic acid, or based on an alcohol, glycol or phenol.

17. The curable composition of claim 16, wherein said metallic containing cocatalyst is salt of a mono or dicarboxylic acid containing from 1 to about 20 carbon atoms.

18. The curable composition of claim 17, wherein said mono or dicarboxylic acid is selected from the group consisting of acetic, acrylic, methacrylic, propionic, butyric, hexanoic, octanoic, decanoic, stearic, oleic, eiconsanoic, benzoic, oxalic, malic, maleic, succinic, sebacic and phthalic acids.

19. The curable composition of claim 15, wherein said metallic containing cocatalyst is salt of a hydroxy carboxylic acid containing from 2 to 20 carbon atoms.

20. The curable composition of claim 19, wherein said hydroxy carboxylic acid is selected from the group consisting of hydroxy acetic, lactic, citric, tartaric, salicylic, and gluconic acid.

21. The curable composition of claim 15, wherein said metallic containing salt is a salt of an inorganic acid selected from the group consisting of carbonic, hydrochloric, hydrobromic, and hydriodic, nitric, sulfuric and phosphoric acid.

22. The curable composition of claim 12, wherein said metallic containing cocatalyst is a chelate.

23. The curable composition of claim 22, wherein said metallic chelate is selected from the group consisting of zinc acetylacetonate, copper acetylacetonate, iron acetylacetonate, zirconium acetylacetonate, bismuth acetylacetonate, nickel acetylacetonate, zinc acetate, and zinc lactate.

24. The curable composition of claim 23, wherein said metallic chelate is a metallic acetylacetonate.

25. The curable composition of claim 1, wherein said catalyst is soluble in another component of the curable composition or in a solvent for at least one component of the composition.

26. The curable composition of claim 12, wherein said metallic containing cocatalyst is soluble in another component of the curable composition or in a solvent for at least one component of the composition.

27. The curable composition of claim 26, wherein said metallic containing cocatalyst is soluble in said functional compound.

28. The composition of claim 12 wherein the ratio by weight of the polystannoxane catalyst to co-catalyst is in the range of 10:1 to 1:10.

29. The composition of claim 28 wherein the ratio by weight of the polystannoxane catalyst to co-catalyst is in the range of 4:1 to 1:4.

30. A process for curing a blocked isocyanate at a temperature below about 180° C. comprising forming a mixture of:

(I) a blocked isocyanate;
(ii) a functional component containing at least one active hydrogen and reactive with said blocked isocyanate;

(iii) a polystannoxane catalyst for the reaction of said blocked isocyanate with said functional component, of the formula:

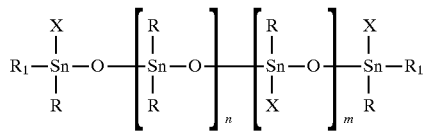

wherein each R is the same or different, and independently selected from the group consisting of methyl, ethyl, propyl, butyl, isopropyl, amyl, hexyl, heptyl, lauryl, octyl groups, phenyl, tolyl, xylyl, and benzyl; each X is the same or different and independently selected from the group consisting of chlorine, bromine, iodine, hydroxyl, methoxy, ethoxy, propoxy, butoxy, carbonate, phosphate, phosphinate, isocyanate, sulfonate, formyloxy, acetoxy, propionoyloxy, butyroyloxy, hexanolyloxy, lauroyloxy, oleoyloxy, palmitoyloxy, stearoyloxy, benzolyloxy, allylcarbonyloxy, cyanoacetoxy, benzyloyloxy alkyl, maleoyloxy, a mono organotin group of the formula:

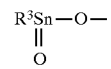

in which $R^3$ is selected from among the same group as R, and a tri organotin group of the formula $(R^2)_3SnO-$ in which each $R^2$ is selected from among the same group as R; each $R_1$ is the same or different and selected from among the same groups as R or X; n is an integer from 1 to 20, m is an integer from zero to 19, and the sum of n plus m is an integer from 3 to 20; and, curing said mixture at a temperature below about 150° C.

31. The process of claim 30, wherein said blocked isocyanate is a blocked polyisocyanate and said functional component reactive with said blocked polyisocyanate is a polyol.

32. The process of claim 30, wherein said catalyst is liquid at about room temperature.

33. A process for coating a substrate comprising:

(a) contacting said substrate with a curable coating composition comprising:
(i) a blocked isocyanate;
(ii) a functional component containing at least one active hydrogen reactive with said blocked reactive component;
(iii) a catalyst for promoting the reaction of said reactive component with said functional component comprising a polystannoxane of the formula

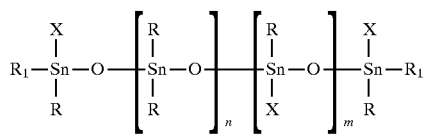

wherein each R is the same or different, and independently selected from the group consisting of methyl, ethyl, propyl, butyl, isopropyl, amyl, hexyl, heptyl, lauryl, octyl groups, phenyl, tolyl, xylyl, and benzyl; each X is the same or different and independently selected from chlorine, bromine, iodine, hydroxyl, methoxy, ethoxy, propoxy, butoxy, carbonate, phosphate, phosphinate, isocyanate, sulfonate, formyloxy, acetoxy, propionoyloxy, butyroyloxy, hexanolyloxy, lauroyloxy, oleoyloxy, palmitoyloxy, stearoyloxy, benzolyloxy, allylcarbonyloxy, cyanoacetoxy, benzyloyloxy alkyl, maleoyloxy, a mono organotin group of the formula:

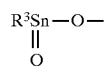

in which $R^3$ is selected from among the same group as R, and a tri organotin group of the formula $(R^2)_3SnO-$ in which each $R^2$ is selected from among the same group as R; each $R_1$ is the same or different and selected from among the same groups as R or X; n is an integer from 1 to 20, m is an integer from 0 to 19, and the sum of n plus m is an integer from 3 to 20; and, curing said coating at a temperature above ambient and below about 180° C.

34. An improved process for catalyzing the making of a polyurethane from reactants containing a blocked isocyanate and a catalyst wherein the improvement comprises utilizing as the catalyst for both unblocking the isocyanate and polyurethane formation, a polystannoxane of the formula:

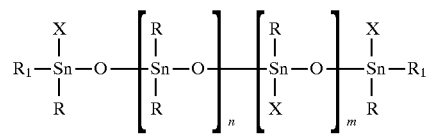

wherein each R is the same or different, and independently selected from an alkyl group having 1 to 20 carbon atoms, and an aromatic group; each X is the same or different and independently selected from halogen, hydroxyl, alkoxy, carbonate, phosphate, phosphinate, isocyanate, sulfonate, carboxylic, acyloxy, a mono organotin group of the formula:

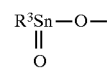

in which $R^3$ is selected from among the same group as R, or a tri organotin group of the formula $(R^2)_3SnO-$ in which each $R^2$ is selected from among the same group as R; each $R^1$ is the same or different and selected from among the same groups as R or X; n is an integer from 1 to 20, m is an integer from zero to 19, and the sum of n plus m is an integer from 3 to 20.

* * * * *